(12) United States Patent
Meng et al.

(10) Patent No.: US 10,528,434 B2
(45) Date of Patent: Jan. 7, 2020

(54) METHOD, DEVICE AND TERMINAL FOR RESTORING FIRMWARE PROGRAM

(71) Applicant: Xiaomi Inc., Beijing (CN)

(72) Inventors: Deguo Meng, Beijing (CN); Yue Liang, Beijing (CN); Enxing Hou, Beijing (CN)

(73) Assignee: XIAOMI INC., Beijing (CN)

( * ) Notice: Subject to any disclaimer, the term of this patent is extended or adjusted under 35 U.S.C. 154(b) by 251 days.

(21) Appl. No.: 15/221,350

(22) Filed: Jul. 27, 2016

(65) Prior Publication Data

US 2016/0335014 A1 Nov. 17, 2016

Related U.S. Application Data

(63) Continuation of application No. PCT/CN2015/093856, filed on Nov. 5, 2015.

(30) Foreign Application Priority Data

Dec. 22, 2014 (CN) .......................... 2014 1 0806750

(51) Int. Cl.
*G06F 11/14* (2006.01)
*G06F 3/06* (2006.01)
(Continued)

(52) U.S. Cl.
CPC .......... *G06F 11/1469* (2013.01); *G06F 3/065* (2013.01); *G06F 3/067* (2013.01);
(Continued)

(58) Field of Classification Search
None
See application file for complete search history.

(56) References Cited

U.S. PATENT DOCUMENTS

| | | | |
|---|---|---|---|
| 4,805,093 A * | 2/1989 | Ward | G06F 17/30982 707/E17.043 |
| 8,181,007 B2 * | 5/2012 | Liu | G06F 11/1433 713/1 |

(Continued)

FOREIGN PATENT DOCUMENTS

| CN | 1606730 A | 4/2005 |
|---|---|---|
| CN | 101071392 A | 11/2007 |

(Continued)

OTHER PUBLICATIONS

International Search Report to PCT/CN2015/093856 dated Jan. 15, 2016, (4p).

(Continued)

*Primary Examiner* — Charles J Choi
(74) *Attorney, Agent, or Firm* — Brinks Gilson & Lione

(57) ABSTRACT

The present disclosure provides a method, a device and a terminal for restoring a firmware program, which pertains to the technical field of electronic devices. The method may be applied in a terminal having an activated first storage region storing a firmware program most recently executed by the terminal and an inactivated second storage region storing a back-up firmware program. The method may include: receiving a signal to restore a firmware program in the terminal; in response to the receiving of the signal to restore the firmware program, deactivating the first storage region and activating the second storage region; and loading in the terminal the back-up firmware program stored in the activated second storage region. The disclosure may solve a problem in the related art that a firmware program can be restored only by using a flash tool, and it may achieve an effect of restoring a firmware program with the use of a single key, and thus facilitate simpler operation of the terminal by the user.

14 Claims, 6 Drawing Sheets

(51) Int. Cl.
*G06F 11/16* (2006.01)
*G06F 11/20* (2006.01)

(52) U.S. Cl.
CPC .......... *G06F 3/0619* (2013.01); *G06F 3/0644* (2013.01); *G06F 11/1417* (2013.01); *G06F 11/1448* (2013.01); *G06F 11/1666* (2013.01); *G06F 11/20* (2013.01)

(56) References Cited

U.S. PATENT DOCUMENTS

| | | | |
|---|---|---|---|
| 2002/0091919 | A1 | 7/2002 | Goodman et al. |
| 2003/0131180 | A1 | 7/2003 | Ho et al. |
| 2003/0191930 | A1 | 10/2003 | Viljoen et al. |
| 2004/0068334 | A1 | 4/2004 | Tsai et al. |
| 2004/0172578 | A1* | 9/2004 | Chen .................. G06F 11/1417 714/15 |
| 2004/0193998 | A1* | 9/2004 | Blackburn ......... G06Q 20/3552 714/763 |
| 2007/0055969 | A1 | 3/2007 | Yang |
| 2008/0126444 | A1* | 5/2008 | van Ingen ........... G06F 11/1464 |
| 2010/0180108 | A1 | 7/2010 | Liu |
| 2010/0199272 | A1 | 8/2010 | Mahajan et al. |
| 2012/0110378 | A1 | 5/2012 | Fan et al. |
| 2014/0281693 | A1* | 9/2014 | Jeddeloh ............. G06F 11/2017 714/6.32 |
| 2014/0310698 | A1 | 10/2014 | Lee et al. |

FOREIGN PATENT DOCUMENTS

| | | |
|---|---|---|
| CN | 101308470 A | 11/2008 |
| CN | 101571807 A | 11/2009 |
| CN | 101866269 A | 10/2010 |
| CN | 102455950 A | 5/2012 |
| CN | 102830984 A | 12/2012 |
| CN | 103019833 A | 4/2013 |
| CN | 103116501 A | 5/2013 |
| CN | 103533024 A | 1/2014 |
| CN | 103853638 A | 6/2014 |
| CN | 104536848 A | 4/2015 |
| EP | 0 936 548 A1 | 8/1999 |
| JP | H11-316687 A | 11/1999 |
| JP | 2000039993 A | 2/2000 |
| JP | 2005-515524 A | 5/2005 |
| JP | 2007-264870 A | 10/2007 |
| JP | 2008-077249 A | 4/2008 |
| JP | 2012-198929 A | 10/2012 |
| KR | 10-2014-0123143 A | 10/2014 |
| RU | 130 429 U1 | 7/2013 |
| TW | 2004-16544 A | 9/2004 |

OTHER PUBLICATIONS

Notice of Allowance dated May 16, 2017 for Korean Application No. 10-2016-7000001, 3 pages.
Office Action dated Feb. 23, 2017 for Chinese Application No. 201410806750.8, 7 pages.
Office Action dated Mar. 16, 2017 for Japanese Application No. 2016-565550, 4 pages.
Office Action dated Jul. 11, 2017 for Russian Application No. 2016114090/08, 8 pages.
Extended European Search Report dated Nov. 29, 2016 for European Application No. 15853644.1, 8 pages.
International Search Report dated Jan. 15, 2016 for International Application No. PCT/CN2015/093856, 4 pages.
Office Action dated Sep. 1, 2016 for Korean Application No. 10-2016-7000001, 6 pages.
Examination Report dated Jun. 25, 2018 for European Application No. 15853644.1, 6 pages.

* cited by examiner

METHOD, DEVICE AND TERMINAL FOR RESTORING FIRMWARE PROGRAM

CROSS-REFERENCE TO RELATED APPLICATIONS

This application is a continuation of International Application No. PCT/CN2015/093856, filed Nov. 5, 2015, which is based upon and claims the benefit of priority to Chinese Patent Application No. CN201410806750.8, filed Dec. 22, 2014, wherein the entirety of each of the aforementioned applications is hereby incorporated herein by reference.

TECHNICAL FIELD

The present disclosure generally relates to the technical field of electronic devices, and more particularly, to a method, a device and a terminal for restoring a firmware program.

BACKGROUND

Firmware refers to software functioning at the bottom layer of an electronic device to support the normal operation of the electronic device. Typically, when firmware in the electronic device fails, the firmware must be restored.

To restore firmware in an electronic device, a user normally has to connect the electronic device to a flash tool, and a new firmware program will be written into the electronic device by the flash tool to restore the firmware.

SUMMARY

The present disclosure provides a method, a device and a terminal for restoring a firmware program. A technical solution is as follows.

According to a first aspect of embodiments of the present disclosure, there is provided a method for restoring a firmware program, which is applied in a terminal having an activated first storage region storing a firmware program most recently executed by the terminal and an inactivated second storage region storing a back-up firmware program. The method may include receiving a signal to restore a firmware program in the terminal. The method may further include, in response to the receiving of the signal to restore the firmware program, deactivating the first storage region and activating the second storage region. The method may further include loading in the terminal the back-up firmware program stored in the activated second storage region.

According to a second aspect of embodiments of the present disclosure, there is provided a terminal including an activated first storage region configured to store a firmware program most recently executed by the terminal and an inactivated second storage region configured to store a back-up firmware program. The terminal may further include a processor and a memory for storing instructions executable by the processor. The processor may be configured to receive signal to restore a firmware program in the terminal. The processor may be further configured to, in response to the receiving of the signal to restore the firmware program, deactivate the first storage region and activate the second storage region. The processor may further be configured to load in the terminal the back-up firmware program stored in the activated second storage region.

According to a third aspect of embodiments of the present disclosure, there is provided a device to restore a firmware program, to be used in a terminal having an activated first storage region storing a firmware program most recently executed by the terminal and an inactivated second storage region storing a back-up firmware program. The device to restore a firmware program may include a processor and a memory for storing instructions executable by the processor. The processor may be configured to receive a signal to restore a firmware program in the terminal. The processor may further be configured to, in response to receiving the signal to restore the firmware program, deactivate the first storage region and activate the second storage region. The processor may further be configured to load in the terminal the back-up firmware program stored in the activated second storage region.

According to a fourth aspect of embodiments of the present disclosure, there is provided a non-transitory computer-readable storage medium storing instructions executable by a processor of a terminal having an activated first storage region storing a firmware program most recently executed by the terminal and an inactivated second storage region storing a back-up firmware program. The instructions may, when executed by the processor, cause the terminal to receive a signal to restore a firmware program in the terminal. The instructions may further, when executed by the processor, cause the terminal to, in response to the receiving of the signal to restore the firmware program, deactivate the first storage region and activate the second storage region. The instructions may further, when executed by the processor, cause the terminal to load in the terminal the back-up firmware program stored in the activated second storage region.

It is to be understood that both the foregoing general description and the following detailed description are exemplary and explanatory only and are not restrictive of the disclosure or the appended claims.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings, in which the same numbers in different drawings represent the same or similar elements unless otherwise noted. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
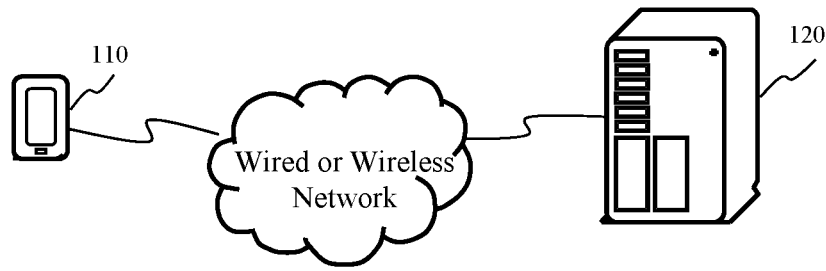
FIG. 1 is a schematic diagram illustrating an implementation environment involved in a method for restoring a firmware program according to exemplary embodiments.

FIG. 1 is a schematic diagram illustrating an implementation environment involved in a method for restoring a firmware program according to exemplary embodiments of the present disclosure. As shown in FIG. 1, the implementation environment may include a terminal 110 and a server 120.

The terminal 110 is a terminal such as a mobile phone, a tablet computer, an e-book reader, a desktop computer, a notebook computer, a digital camera, a router, switching equipment, a printer, a main board, a game console or the like. The terminal 110 may be connected to the server 120 via a wired or wireless network.

The network 120 may include one or more high performance computers or a cloud computer center. The server 120 is configured to provide service for the terminal 110.

Figure 2:
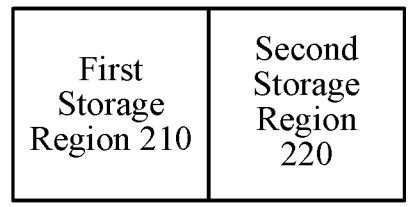
FIG. 2 is a block diagram illustrating a terminal according to an exemplary embodiment.

As shown in FIG. 2, the terminal 110 may include an activated first storage region 210 for storing a firmware program most recently executed by the terminal and an inactivated second storage region 220 for storing a back-up firmware program.

Optionally, the first storage region 210 and the second storage region 220 may be two storage regions in a built-in memory of the terminal. For example, the first storage region 210 and the second storage region 220 may be two respective storage regions in a flash memory.

Optionally, the firmware program stored in the first storage region 210 may have a version number the same as or different from that of the back-up firmware program stored in the second storage region 220.

For example, the firmware program stored in the first storage region 210 is a version 3.2, and the back-up firmware program stored in the second storage region 220 is a version distributed earlier, such as a version 3.1. However, the first storage region 210 and the second storage region 220 may store the same version, such as a version 3.2. The disclosure is not however limited to these examples.

Optionally, the first storage region 210 may have a size the same as or different from that of the second storage region 220. Optionally, the first storage region 210 and the second storage region 220 may generally have the same size.

Optionally, there may be provided one, two or more second storage regions 220. The disclosure is not however limited to these examples. Optionally, to save storage resources of the terminal and further improve utilization of the resources of the terminal, one second storage region 220 is generally provided.

Figure 3:
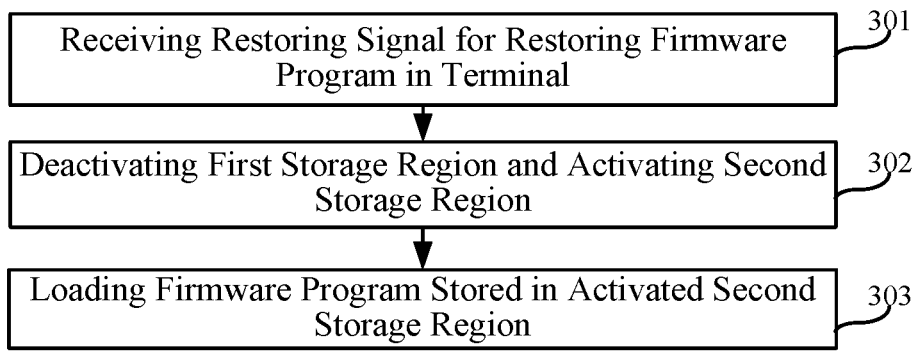
FIG. 3 is a flow chart illustrating a method for restoring a firmware program according to an exemplary embodiment.

FIG. 3 is a flow chart illustrating a method for restoring a firmware program according to an exemplary embodiment. As shown in FIG. 3, in an embodiment, a method for restoring a firmware program may be applied in the terminal 110 as shown in FIG. 1, for example. A method for restoring a firmware program may include steps 301, 302, and 303.

In step 301, a signal to restore a firmware program in the terminal is received. The signal to restore the firmware program may also be known as a restoring signal.

In step 302 the first storage region is deactivated and the second storage region is activated.

In step 303, the firmware program stored in the activated second storage region is loaded.

Accordingly, in an embodiment of a method to restore a firmware program, an activated first storage region storing a firmware program most recently executed by the terminal and an inactivated second storage region storing a back-up firmware program are provided in a terminal. In order to restore a firmware program as desired, the terminal may, in response to the received signal to restore the firmware program in the terminal, simply deactivate the first storage region, activate the second storage region, and load in the terminal the back-up firmware program stored in the activated second storage region. Thus, it may solve a problem in the related art that a firmware program can be restored only by using a flash tool, and it may achieve an effect of restoring a firmware program with the use of a single key, and thus facilitate simpler operation of the terminal by the user.

Figure 4A:
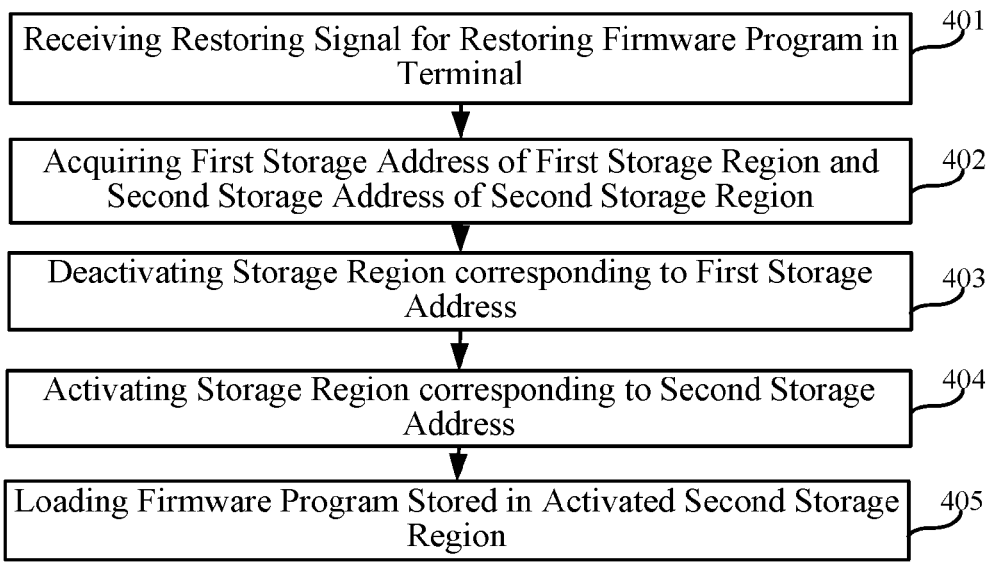
FIG. 4A is a flow chart illustrating a method for restoring a firmware program according to an exemplary embodiment.

FIG. 4A is a flow chart illustrating a method for restoring a firmware program according to an exemplary embodiment. As shown in FIG. 4A, in an embodiment, a method for restoring a firmware program may be applied in the terminal 110 as shown in FIG. 1, for example. A method for restoring a firmware program may include steps 401, 402, 403, 404, and 405, exemplary embodiments of which are discussed below.

In step 401, a signal to restore a firmware program in the terminal is received. The signal to restore the firmware program may also be known as a restoring signal.

The user may trigger the terminal to restore the firmware program. Accordingly, the terminal receives a signal to restore the firmware program in the terminal. The terminal may be provided with a restoring key or button, and the user may send a signal to restore by pressing the restoring key or button. The disclosure is not however limited to these examples.

Optionally, when the firmware program in the terminal fails, the user may trigger the terminal to restore the firmware program.

Optionally, when the user dislikes the current version of the firmware program in the terminal, and desires to restore the firmware program to the previous version, the user may trigger the terminal to restore the firmware program.

In step 402, a first storage address of the first storage region and a second storage address of the second storage region are acquired.

Figure 4B:
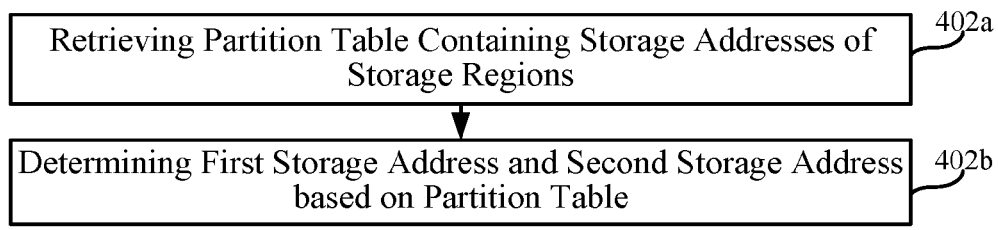
FIG. 4B is a flow chart illustrating a process for a terminal acquiring a first storage address and a second storage address according to an exemplary embodiment.

Optionally, as shown in FIG. 4B, step 402 may include the steps 402a and 402b, exemplary embodiments of which are discussed below.

In step 402a, a partition table containing storage addresses of storage regions is retrieved.

After the terminal receives the restoring signal, the terminal may in response retrieve a pre-stored partition table which contains storage addresses of storage regions.

In step 402b, the first storage address and the second storage address are determined based on the retrieved partition table.

The terminal may derive the first storage address corresponding to the first storage region and the second storage address corresponding to the second storage region from the partition table.

Optionally, when there are two or more second storage regions, the terminal may derive two or more second storage addresses respectively corresponding to each of the second storage regions. The disclosure is not however limited to these examples.

In step 403, a storage region corresponding to the first storage address is deactivated.

After the terminal receives the restoring signal, the terminal may in response deactivate a storage region corresponding to the first storage address.

Optionally, the terminal may set a state flag for each storage region, and the terminal may modify the flag of the storage region corresponding to the first storage address. For example, the terminal may set a flag of an activated storage region as "1", and set a flag of an inactivated storage region as "0". For example, the terminal may modify the flag of the storage region corresponding to the first storage address to be "0" from a previous setting of "1".

Optionally, the terminal may set a flag only for an activated storage region, and set no flag for an inactivated storage region. For example, the terminal may delete the flag of the storage region corresponding to the first storage address.

Optionally, the terminal may also set a flag only for an inactivated storage region, and set no flag for an activated storage region. For example, the terminal may set a flag for the storage region corresponding to the first storage address.

The above disclosed manners through which the terminal deactivates the storage region corresponding to the first storage address are only exemplary. The disclosure is not limited to these examples. Optionally, the terminal may deactivate the storage region corresponding to the first storage address through other manners.

In step 404, a storage region corresponding to the second storage address is activated.

After the terminal receives the restoring signal, the terminal may in response activate the storage region corresponding to the second storage address.

Optionally, the terminal may set a state flag for each storage region, and the terminal may modify the flag of the storage region corresponding to the second storage address. For example, the terminal may set a flag of an activated storage region as "1", and set a flag of an inactivated storage region as "0". For example, the terminal may modify the flag of the storage region corresponding to the second storage address to be "1" from a previous setting of "0".

Optionally, the terminal may set a flag only for an activated storage region, and set no flag for an inactivated storage region. For example, the terminal may set a flag for the storage region corresponding to the second storage address.

Optionally, the terminal may also set a flag only for an inactivated storage region, and no flag for an activated storage region. For example, the terminal may delete the flag for the storage region corresponding to the second storage address.

In the present embodiment, the above manners through which the terminal activates the storage region corresponding to the second storage address are only exemplary. The disclosure is not limited to these examples. Optionally, the terminal may activate the storage region corresponding to the second storage address through other manners.

Figure 4C:
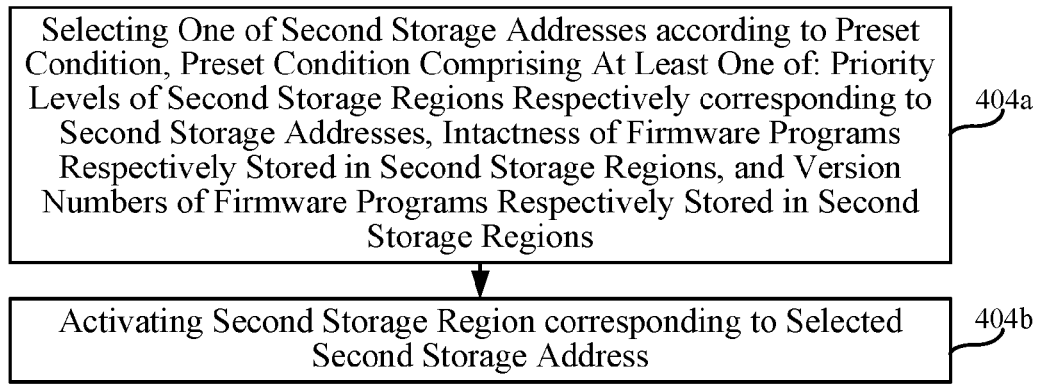
FIG. 4C is a flow chart illustrating a terminal activating a second storage region according to an exemplary embodiment.

Optionally, when there are two or more second storage regions, and two or more respective second storage addresses corresponding to respective second storage regions are acquired, step 404 may include steps 404a and 404b, as shown in FIG. 4C, exemplary embodiments of which are discussed below.

In step 404a, one of the second storage addresses is selected according to a preset condition. The preset condition may include one or more one of the following: respective priority levels of the respective second storage regions corresponding to the plurality of second storage addresses; respective intactness of respective firmware programs stored in the plurality of second storage regions; and respective version numbers of the respective firmware programs stored in the respective second storage regions corresponding to the plurality of second storage addresses. The preset condition may be stored in a manner accessible to the terminal, for example in memory of the terminal.

The terminal may select, according to the preset condition, one second storage address from among the second storage addresses.

Optionally, the terminal may set respective priority levels by which restoration from the respective second storage regions will occur, each representing a respective priority level for a respective second storage region to be used in restoring of the firmware program. The terminal may select a second storage address having the highest respective priority level among the second storage addresses. For example, assume there are three second storage addresses A, B and C, with a restoring priority order of address B having the highest priority level, address A having second highest priority level, and address C having the lowest priority level. In this case, the terminal may select the second storage address B to use for restoring the firmware in the terminal.

Optionally, the terminal may set respective check codes for the respective firmware programs stored in the respective storage regions corresponding to the respective second storage addresses. The terminal may determine whether a firmware program stored in a storage region corresponding to a second storage address is intact based upon the check code of that firmware program, and select a second storage address in which the firmware program is intact. Optionally, if there are two or more second storage addresses each having intact respective firmware programs, the terminal may randomly select one of them to use for restoring the firmware in the terminal, or may select one to use for restoring the firmware in the terminal, based on respective priority level of respective storage region or based on respective version number of respective firmware program. The disclosure is not limited to these examples.

Optionally, the terminal may derive respective version numbers of the respective firmware programs stored in the respective storage regions corresponding to the plurality of second storage addresses, and select for use in restoring the firmware in the terminal a second storage address corresponding to a storage region with the highest corresponding version number out of the storage regions.

In the above, an exemplary preset condition was described as including one condition. However, optionally, two or three of the conditions combined may be set as the present condition. The disclosure is not limited to these examples. Optionally, in the above embodiment, as an example, the present condition includes all three of the explicitly discussed conditions. However, optionally, the preset condition may also include other conditions. The disclosure is not limited to these examples.

In step 404b, a second storage region corresponding to the selected second storage address is activated.

After the terminal selects one second storage address from the two or more second storage addresses, for example through step 404a, the terminal may in response activate a second storage region corresponding to the selected second storage address.

Optionally, the terminal may activate the second storage region corresponding to the selected second storage address through a similar manner as described above, for example in step 404. The disclosure is not however limited to these examples.

In step 405, the firmware program stored in the activated second storage region is loaded.

The terminal may load the firmware program stored in the activated second storage region.

Optionally, the terminal may load the firmware program stored in the activated second storage region during a reboot process.

Optionally, after the terminal deactivates the first storage region and activates the second storage region, the terminal may in response be rebooted automatically, and may in response load the firmware program stored in the activated second storage region during the reboot process.

Optionally, after the terminal deactivates the first storage region and activates the second storage region, the terminal may in response present a prompt message to the user to reboot the terminal. Then, the terminal may be rebooted under trigger of the user, and may in response load the firmware program stored in the activated second storage region during the reboot process.

Accordingly, in a method for restoring a firmware program provided in the embodiment of the present disclosure, an activated first storage region storing a firmware program most recently executed by the terminal and an inactivated second storage region storing a back-up firmware program are provided in a terminal. In order to restore a firmware program as desired, the terminal may, in response to the received signal to restore the firmware program in the terminal, simply deactivate the first storage region, activate the second storage region, and load in the terminal the back-up firmware program stored in the activated second storage region. Thus, it may solve the problem in the related art that a firmware program can be restored only by using a flash tool, and it may achieve an effect of restoring a firmware program with use of a single key, and thus facilitate simpler operation by the user.

In an embodiment, a user may restore a firmware program in a terminal with use of a single key, which may save the user time when restoring the firmware program.

Figure 4D:
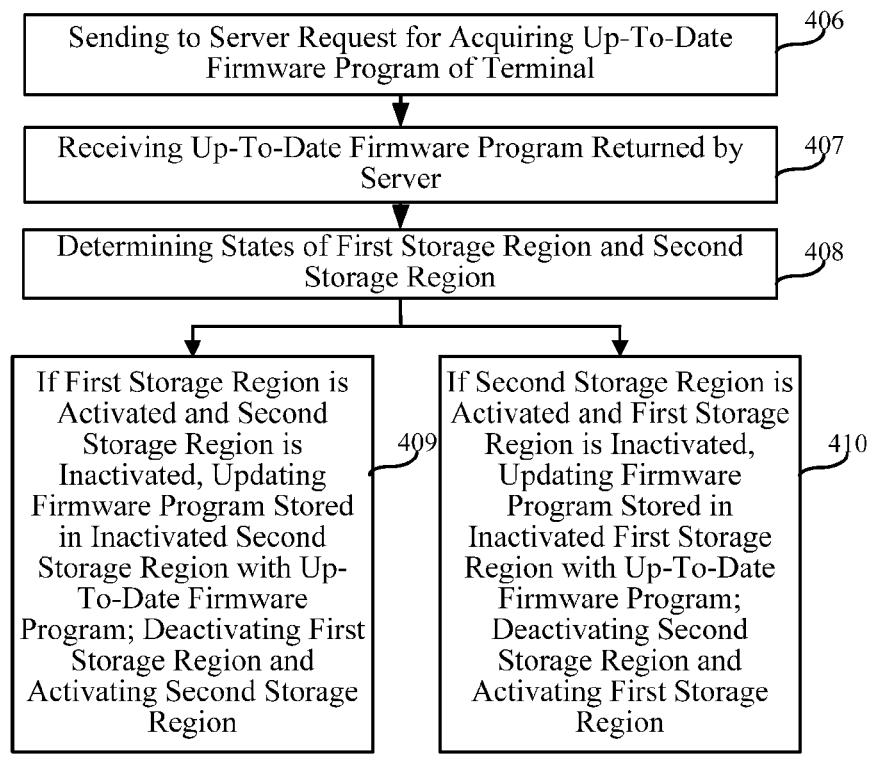
FIG. 4D is a flow chart illustrating a terminal updating a firmware program according to an exemplary embodiment.

A user may additionally or alternatively trigger updating of a firmware program stored in a terminal. As shown in FIG. 4D, a process of a terminal updating a firmware program may include steps 406, 407, and 408, and one or both of steps 409 and 410, exemplary embodiments of which are discussed below.

In step 406, a request for an up-to-date firmware program for the terminal is sent to a server.

Optionally, the user may find a desired version of a firmware program on a website, and operate the terminal to download the up-to-date firmware program to the terminal. Optionally, the terminal may send to the server a request for an up-to-date firmware program of the terminal.

In step 407, an up-to-date firmware program from the server in response to the request is received by the terminal.

In step 408, respective activation states of the first storage region and the second storage region are determined.

Optionally, the terminal may retrieve the respective state flags of the first storage region and the second storage region, and determine the respective activation states of the first storage region and the second storage region based on the respective state flags.

In step 409, if the first storage region is activated and the second storage region is inactivated, a firmware program stored in the inactivated second storage region is updated with the up-to-date firmware program, the first storage region is deactivated, and the second storage region is activated.

If the terminal determines that the first storage region is activated and the second storage region is inactivated, the terminal may in response update the firmware program stored in the second storage region with the up-to-date firmware program. Optionally, the terminal may delete the pre-existing firmware program stored in the second storage region and write to the second storage region the received up-to-date firmware program.

In order to run the updated firmware program, the terminal may then deactivate the first storage region and activate the second storage region, the process of which can be similar to previously discussed steps 402-404.

Optionally, after the terminal activates the second storage region, the terminal may in response load the firmware program stored in the activated second storage region.

In step 410, if the second storage region is activated and the first storage region is inactivated, a firmware program stored in the inactivated first storage region is updated with the up-to-date firmware program, the second storage region is deactivated, and the first storage region is activated.

If the terminal determines that the second storage region is activated and the first storage region is inactivated, the terminal may in response update the firmware program stored in the inactivated first storage region with the up-to-date firmware program. Then the second storage region is deactivated and the first storage region is activated, by a process similar to step 409.

In the above exemplary description, the terminal is described as updating only a firmware program stored in an inactivated storage region. However, optionally, the terminal may also update the firmware programs stored in both activated and inactivated storage regions. The disclosure is not however limited to these examples. In the above exemplary description, the terminal is described as only updating a firmware program stored in an inactivated storage region because such an embodiment may ensure that the terminal can operate continuously during the update of the firmware program. The disclosure however is not limited to such an implementation.

Figure 4E:
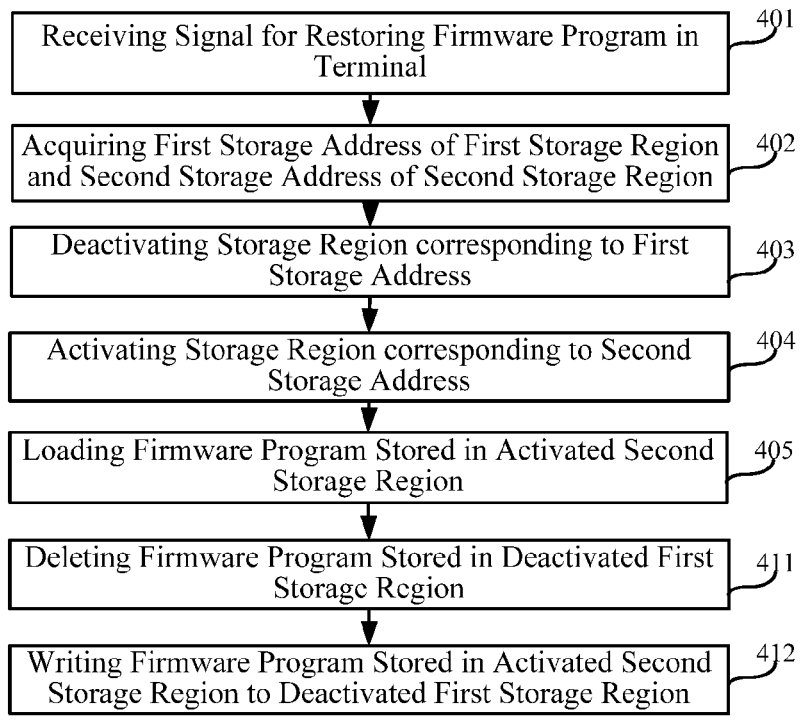
FIG. 4E is a flow chart illustrating a method for restoring a firmware program according to an exemplary embodiment.

As shown in FIG. 4E, a method for restoring a firmware program may include, after step 405 further steps 411 and 412, exemplary embodiments of which are discussed below.

In step 411, the firmware program stored in the deactivated first storage region is deleted.

The terminal restoring the firmware program is normally caused by a failure in the firmware program that has been most recently executed. For example, there may have been damage to the firmware program stored in the first storage region. Thus, after the terminal deactivates the first storage region, the terminal may in response delete the firmware program stored in the deactivated first storage region, and thus delete the damaged firmware program.

In step 412, the firmware program stored in the activated second storage region is written to the deactivated first storage region.

In order to restore the damaged firmware program previously stored in the deactivated first storage region, the terminal may write the firmware program stored in the activated second storage region to the deactivated first storage region.

Optionally, the terminal may present a prompt message to the user prompting the user to back-up to the first storage region the firmware program stored in the second storage region. After seeing the prompt message, the user may trigger the back-up, which writes to the deactivated first storage region the firmware program stored in the activated second storage region.

Optionally, after the terminal deactivates the first storage region and activates the second storage region, the terminal may automatically write to the deactivated first storage region the firmware program stored in the activated second storage region. Thus, even if the firmware program in the activated second storage region were to now fail, the user may still restore the firmware program with the back-up firmware program in the deactivated first storage region. The disclosure is not limited to these examples.

The above exemplary description describes the firmware program stored in the activated second storage region being written to the deactivated first storage region. However, optionally, the user may connect the terminal to a flash tool or a U disk, to restore the damaged firmware program stored in the deactivated first storage region by the flash tool or the U disk. Optionally, the terminal may be connected to a server, and download a firmware program from the server to restore the firmware program stored in the deactivated first storage region. The disclosure is not however limited to these examples.

Figure 4F:
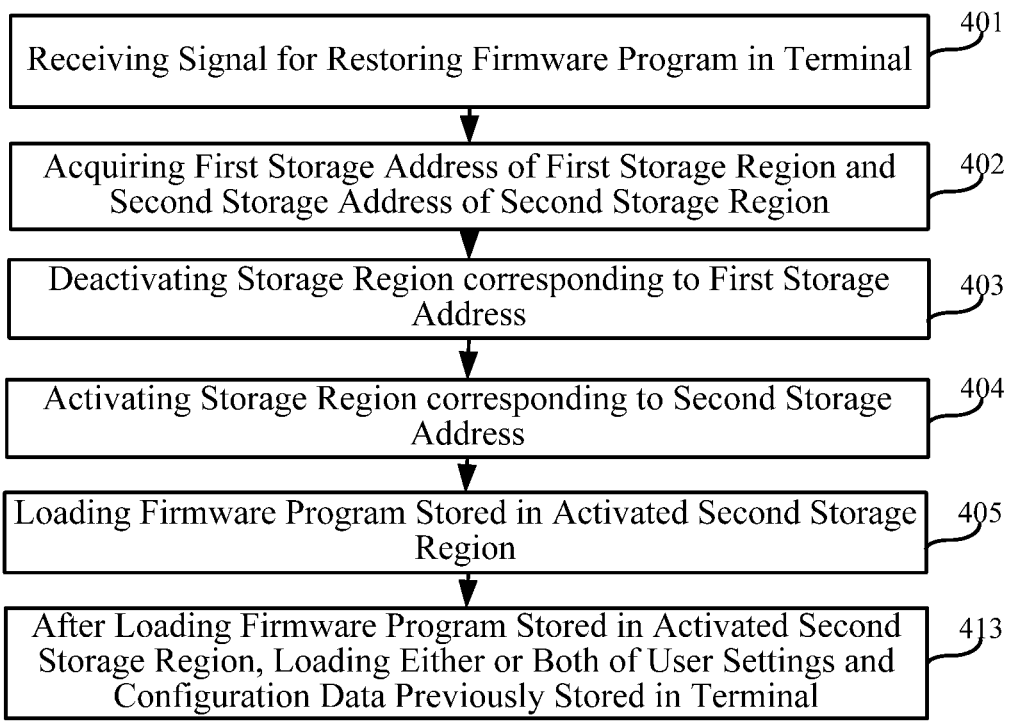
FIG. 4F is a flow chart illustrating a method for restoring a firmware program according to an exemplary embodiment.

As shown in FIG. 4F, after step 405, the terminal may also perform step 413, exemplary embodiments of which are discussed below.

In step 413, at least one of user settings or configuration data previously stored in the terminal is loaded.

During operation of the terminal, at least one of user settings or configuration data previously configured by the user for the terminal may be saved in the terminal. Optionally, the terminal may automatically perform this saving at a predetermined time interval, or may perform saving every time it receives a trigger signal from the user. The disclosure is not however limited to these examples.

After the terminal loads the firmware program stored in the activated second storage region, the terminal may in response further load at least one of the user settings or the configuration data previously stored in the terminal. For example, after the terminal loads the firmware program stored in the activated second storage region, the terminal may further load both of user settings and configuration data previously stored in the terminal. Alternatively or additionally, after the terminal loads the firmware program stored in the activated second region, the terminal may further load either of user settings or configuration data previously stored in the terminal. Thus, even if the terminal restores the firmware program, the user may still employ the user settings that had been configured before the restoration of the firmware program, and the user may not need to perform complex operations to configure those settings again. This may reduce the complexity of user operation, and ensure data security of the configuration data in the terminal during the restoration of the firmware program.

The following are device embodiments of the present disclosure, which may be configured to perform method embodiments of the present disclosure, including those discussed above. For details that are not disclosed in the device embodiments of the present disclosure, reference may be made to previously discussed method embodiments of the present disclosure.

Figure 5:
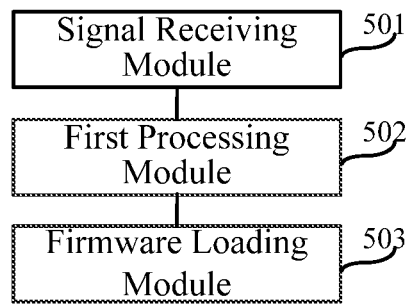
FIG. 5 is a block diagram illustrating a device for restoring a firmware program according to an exemplary embodiment.

FIG. 5 is a block diagram illustrating a device to restore a firmware program according to an exemplary embodiment. As shown in FIG. 5, the device to restore a firmware program may be applied in the terminal 110 in the implementation environment as shown in FIG. 1. A device to restore a firmware program may include, but is not limited to, a signal receiving module 501, a first processing module 502 and a firmware loading module 503, exemplary embodiments of which are discussed below.

The signal receiving module 501 is configured to receive a signal to restore a firmware program in the terminal.

The first processing module 502 is configured to deactivate the first storage region and activate the second storage region.

The firmware loading module 503 is configured to load the firmware program stored in the activated second storage region.

Accordingly, in a device for restoring a firmware program provided in an embodiment of the present disclosure, an activated first storage region for storing a firmware program most recently executed by the terminal and an inactivated second storage region for storing a back-up firmware program are provided in a terminal. In order to restore a firmware program as desired, the terminal may, in response to receiving a signal to restore the firmware program in the terminal, simply deactivate the first storage region, activate the second storage region, and load in the terminal the back-up firmware program stored in the activated second storage region. Thus, it may solve a problem in the related art that a firmware program can be restored only by using a flash tool, and it may achieve an effect of restoring a firmware program with the use of a single key, and thus facilitate simpler operation of the terminal by the user.

Figure 6:
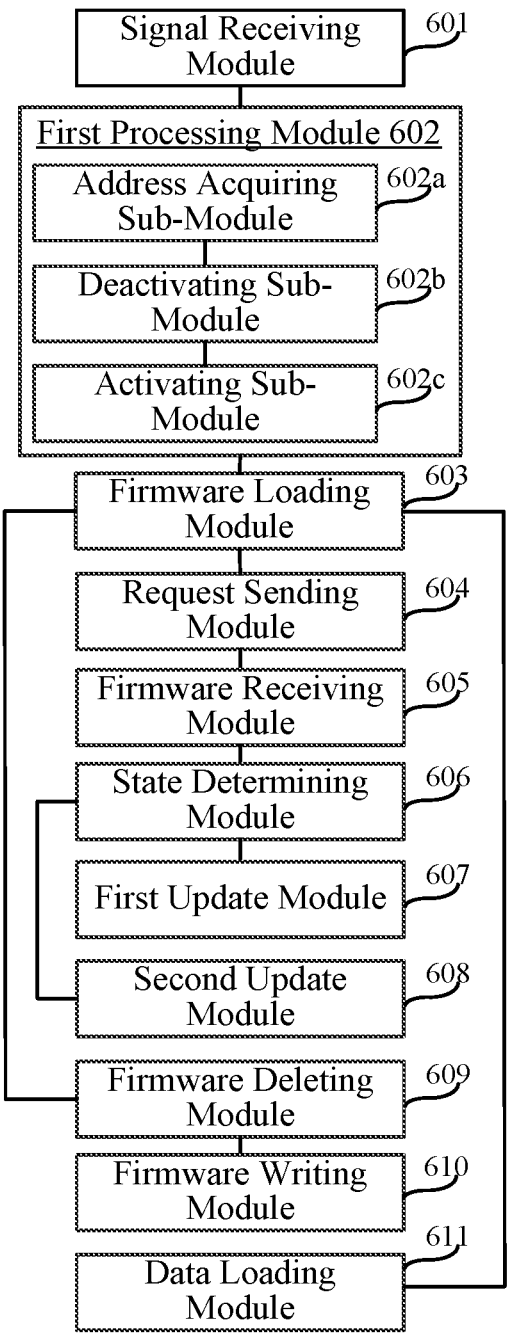
FIG. 6 is a block diagram illustrating a device for restoring a firmware program according to an exemplary embodiment.

FIG. 6 is a block diagram illustrating a device to restore a firmware program according to an exemplary embodiment. As shown in FIG. 6, a device to restore a firmware program is applied in the terminal 110 in the implementation environment as shown in FIG. 1. The device to restore a firmware program may include, but is not limited to, a signal receiving module 601, a first processing module 602 and a firmware loading module 603, exemplary embodiments of which are discussed below.

The signal receiving module 601 is configured to receive a signal to restore a firmware program in the terminal.

The first processing module 602 is configured to deactivate the first storage region and activate the second storage region.

The firmware loading module 603 is configured to load the firmware program stored in the activated second storage region.

Optionally, the first processing module 602 includes an address acquiring sub-module 602a configured to acquire a first storage address of the first storage region and a second storage address of the second storage region.

Optionally, the first processing module 602 includes a deactivating sub-module 602b configured to deactivate a storage region corresponding to the first storage address.

Optionally, the first processing module 602 includes an activating sub-module 602c configured to activate a storage region corresponding to the second storage address.

Optionally, the address acquiring sub-module 602a is configured to retrieve a partition table containing storage addresses of storage regions and determine the first storage address and the second storage address based on the retrieved partition table.

Optionally, the activating sub-module 602c is configured to, when there are two or more second storage addresses, select one of the second storage addresses according to a preset condition. The preset condition may include one or more of the following: respective priority levels of the respective second storage regions corresponding to the plurality of second storage addresses; respective intactness of respective firmware programs stored in the respective second storage regions; and respective version numbers of the respective firmware programs stored in the plurality of second storage regions. Optionally, the activating sub-module 602c is further configured to activate a second storage region corresponding to the selected second storage address.

Optionally, the device further includes a request sending module 604 configured to send to a server a request for an up-to-date firmware program of the terminal.

Optionally, the device further includes a firmware receiving module 605 configured to receive the up-to-date firmware program from the server in response to the request.

Optionally, the device further includes a state determining module 606 configured to determine respective activation states of the first storage region and the second storage region.

Optionally, the device further includes a first update module 607 configured to, in response to a determination that the first storage region is activated and the second storage region is inactivated, update a firmware program stored in the inactivated second storage region with the up-to-date firmware program received by the firmware receiving module, deactivate the first storage region, and activate the second storage region.

Optionally, the device further includes a second update module 608 configured to, in response to a determination that the second storage region is activated and the first storage region is inactivated, update a firmware program stored in the inactivated first storage region with the up-to-date firmware program, deactivate the second storage region, and activate the first storage region.

Optionally, the device further includes a firmware deleting module 609 configured to delete a firmware program stored in the deactivated first storage region.

Optionally, the device further includes a firmware writing module 610 configured to write to the deactivated first storage region the firmware program stored in the activated second storage region.

Optionally, the device further includes a data loading module 611 configured to, after the firmware program stored in the activated second storage region is loaded, in response load at least one of user settings and configuration data previously stored in the terminal.

Accordingly, in a device for restoring a firmware program provided in an embodiment of the present disclosure, an activated first storage region storing a firmware program most recently executed by the terminal and an inactivated second storage region storing a back-up firmware program are provided in a terminal. In order to restore a firmware program as desired, the terminal may, in response to receiving a signal to restore firmware in the terminal, simply deactivate the first storage region, activate the second storage region, and load in the terminal the back-up firmware program stored in the activated second storage region. Thus, it may solve a problem in the related art that a firmware program can be restored only by using a flash tool, and it may achieve an effect of restoring a firmware program with the use of a single key, and thus facilitate simpler operation of the terminal by the user.

Additionally or alternatively, a firmware program stored in a second storage region may be updated with an up-to-date firmware program, and thus it may achieve an effect of updating the firmware program in a terminal. In such an exemplary embodiment, only the firmware program stored in the second storage region is described as being updated, and the firmware program stored in the first storage region which is being currently executed is not updated, because this may ensure that the terminal can operate continuously during the update of the firmware program. The disclosure is not however limited to these examples.

Further, in an embodiment, a firmware program stored in the activated second storage region may be automatically written to the deactivated first storage region. Thereby, even if the firmware program in the activated second storage region were to now fail, the user may still restore the firmware program with the back-up firmware program in the deactivated first storage region.

With respect to devices in above embodiments, specific manners for performing operations for individual modules therein have been described in detail in the methods embodiments, which will not be further elaborated herein.

After a terminal loads the firmware program stored in the activated second storage region, the terminal may further load both of user settings and configuration data previously stored in the terminal. Alternatively or additionally, after the terminal loads the firmware program stored in the activated second region, the terminal may further load either of user setting or configuration data previously stored in the terminal. Thus, after the firmware program is restored, the user does not need to perform complex setting operations. This may reduce complexity of user operation, and ensure data security of the configuration data in a terminal during restoration of a firmware program.

Figure 7:
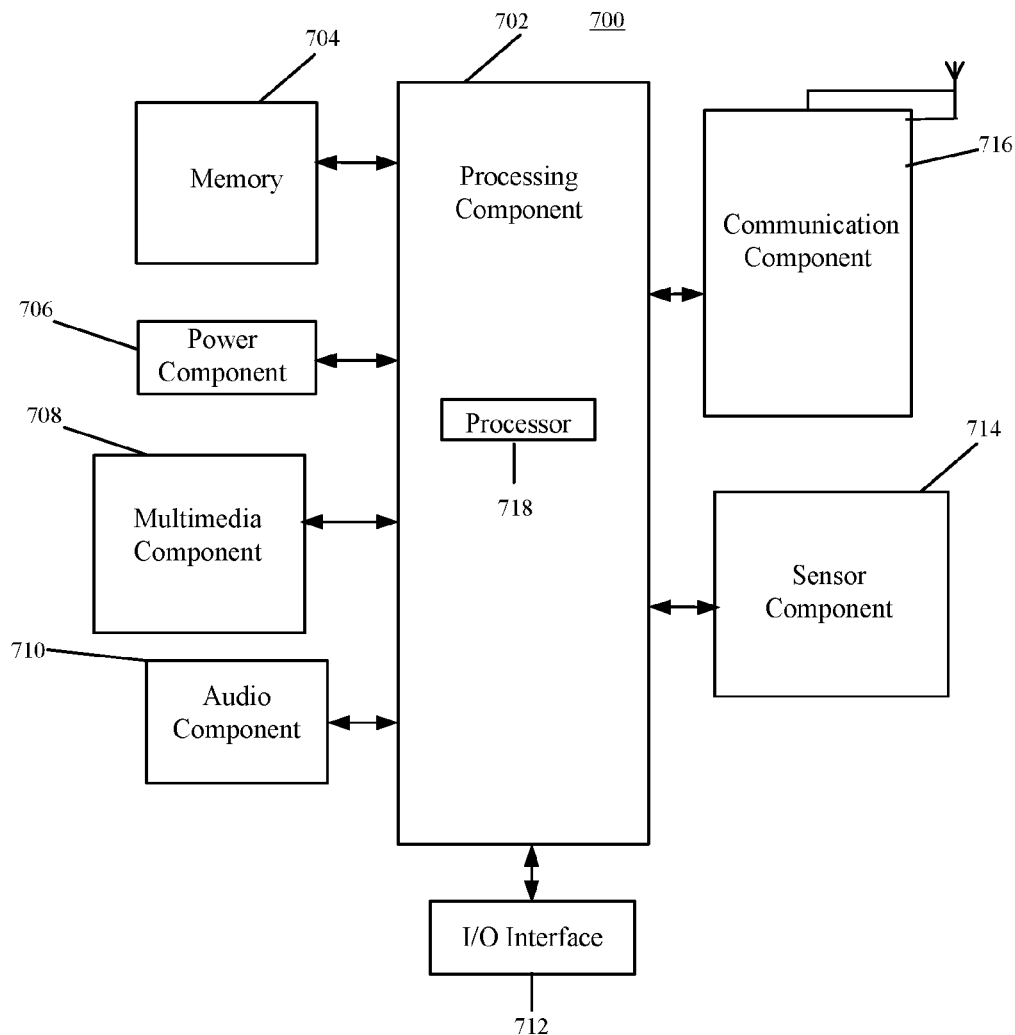
FIG. 7 is a block diagram illustrating a device for restoring a firmware program according to an exemplary embodiment.

FIG. 7 is a block diagram of a device 700 for restoring a firmware program according to an exemplary embodiment. For example, the device 700 may be a mobile phone, a computer, a digital broadcast terminal, a messaging device, a gaming console, a tablet, a medical device, exercise equipment, a personal digital assistant, and the like. Apparatus 700 may, for example, be, include, or be a component of a terminal, including terminal 110, as referenced elsewhere in this disclosure.

Referring to FIG. 7, the device 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 718 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702. Processing component 702 may include any or all of modules and submodules 501, 502, 503, 601, 602, 602a, 602b, 602c, 603, 604, 605, 606, 607, 608, 609, 610, and 611.

The memory 704 is configured to store various types of data to support the operation of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 may include a power management system, one or more power sources, and any other components associated with the generation, management, and distribution of power in the device 700.

The multimedia component 708 includes a screen providing an output interface between the device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may detect an open/closed status of the device 700, relative positioning of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 can access a wireless network based on a communication standard, such as WiFi, 2G or 3G or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 704, executable by the processor 718 in the device 700, for performing the above-described methods. For example, the non-transitory computer-readable storage medium may be a ROM, a RAM, a CD-ROM, a magnetic tape, a floppy disc, an optical data storage device, and the like.

Each module or submodule discussed above, such as signal receiving module 501, first processing module 502, firmware loading module 503, signal receiving module 601, first processing module 602, address acquiring sub-module 602a, deactivating sub-module 602b, activating sub-module 602c, firmware loading module 603, request sending module 604, firmware receiving module 605, state determining module 606, first update module 607, second update module 608, firmware deleting module 609, firmware writing module 610, and data loading module 611, may take the form of a packaged functional hardware unit designed for use with other components, a portion of a program code (e.g., software or firmware) executable by the processor 718 or the processing circuitry that usually performs a particular function of related functions, or a self-contained hardware or software component that interfaces with a larger system, for example.

The methods, devices, and modules described above may be implemented in many different ways and as hardware, software or in different combinations of hardware and software. For example, all or parts of the implementations may be a processing circuitry that includes an instruction processor, such as a central processing unit (CPU), microcontroller, a microprocessor; or application specific integrated circuits (ASICs), digital signal processors (DSPs), digital signal processing devices (DSPDs), programmable logic devices (PLDs), field programmable gate arrays (FPGAs), controllers, micro-controllers, microprocessors, other electronic components; or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method to restore a firmware program of a terminal having an activated first storage region storing a first firmware program most recently executed by the terminal and an inactivated second storage region storing a back-up firmware program, wherein the first firmware program and the back-up firmware program are the same version, and wherein the back-up firmware program stored in the second storage region is configured to be updated in response to a request for an up-to-date firmware program of the terminal, the method comprising:
  receiving a signal to restore a firmware program in the terminal;
  in response to the receiving of the signal to restore the firmware program, deactivating the first storage region and activating the second storage region;
  loading in the terminal the back-up firmware program stored in the activated second storage region;
  deleting the first firmware program stored in the deactivated first storage region;
  writing to the deactivated first storage region the back-up firmware program stored in the activated second storage region, wherein the back-up firmware program stored in the activated second storage region and the deleted first firmware program are the same version; and
  after loading in the terminal the back-up firmware program stored in the activated second storage region, loading in the terminal at least one of user settings or configuration data that were stored in the terminal before restoring the firmware program.

2. The method of claim 1, wherein deactivating the first storage region and activating the second storage region comprises:
  acquiring a first storage address of the first storage region and a second storage address of the second storage region;
  deactivating at least a portion of the first storage region corresponding to the first storage address; and
  activating at least a portion of the second storage region corresponding to the second storage address.

3. The method of claim 2, wherein acquiring the first storage address of the first storage region and the second storage address of the second storage region comprises:
  retrieving a partition table containing storage addresses of storage regions; and
  determining the first storage address and the second storage address based on the retrieved partition table.

4. The method of claim 2, wherein activating the at least a portion of the second storage region corresponding to the second storage address comprises:
  in response to a determination that the terminal includes a plurality of second storage addresses and a plurality of respective corresponding second storage regions, selecting one of the plurality of second storage addresses according to a preset condition, wherein the preset condition comprises at least one selected from the group consisting of:
    respective priority levels of respective second storage regions corresponding to the plurality of second storage addresses,
    respective intactness of respective firmware programs stored in respective second storage regions corresponding to the plurality of second storage addresses, and
    respective version numbers of respective firmware programs stored in respective second storage regions corresponding to the plurality of second storage addresses; and
  activating the at least a portion of the second storage region corresponding to the selected second storage address.

5. The method of claim 1, wherein the method further comprises:
  sending to a server the request for an up-to-date firmware program of the terminal;
  receiving the up-to-date firmware program from the server in response to the request;
  determining respective activation states of the first storage region and the second storage region; and
  in response to a determination that the first storage region is activated and the second storage region is inactivated:
    updating a firmware program stored in the inactivated second storage region with the up-to-date firmware program,
    deactivating the first storage region, and
    activating the second storage region.

6. The method of claim 1, wherein the method further comprises:
  sending to a server the request for an up-to-date firmware program of the terminal;
  receiving the up-to-date firmware program from the server in response to the request;
  determining respective activation states of the first storage region and the second storage region; and
  in response to a determination that the second storage region is activated and the first storage region is inactivated:
    updating a firmware program stored in the inactivated first storage region with the up-to-date firmware program,
    deactivating the second storage region, and
    activating the first storage region.

7. A terminal comprising:
  a first storage region configured to store a first firmware program most recently executed by the terminal and a second storage region configured to store a back-up firmware program, wherein the first firmware program and the back-up firmware program are the same version, and wherein the back-up firmware program stored in the second storage region is configured to be updated in response to a request for an up-to-date firmware program of the terminal;
  a processor; and
  a memory for storing instructions executable by the processor;
  wherein the processor is configured to:
    receive a signal to restore a firmware program in the terminal;
    in response to the receiving of the signal to restore the firmware program, deactivate the first storage region and activate the second storage region;
    load in the terminal the back-up firmware program stored in the activated second storage region;
    delete the first firmware program stored in the deactivated first storage region;
    write to the deactivated first storage region the back-up firmware program stored in the activated second storage region, wherein the back-up firmware program stored in the activated second storage region and the deleted first firmware program are the same version; and
    after loading in the terminal the back-up firmware program stored in the activated second storage region, load in the terminal at least one of user settings or configuration data that were stored in the terminal before restoring the firmware program.

8. The terminal of claim 7, wherein the processor is further configured to:
  acquire a first storage address of the first storage region and a second storage address of the second storage region;
  deactivate at least a portion of the first storage region corresponding to the first storage address; and
  activate at least a portion of the second storage region corresponding to the second storage address.

9. The terminal of claim 8, wherein the processor is further configured to:
  retrieve a partition table containing storage addresses of storage regions; and
  determine the first storage address and the second storage address based on the retrieved partition table.

10. The terminal of claim 8, wherein the processor is further configured to:
  in response to a determination that the terminal includes a plurality of second storage addresses and a plurality of respective corresponding second storage regions, select one of the plurality of second storage addresses according to a preset condition, wherein the preset condition comprises at least one selected from the group consisting of:
    respective priority levels of respective second storage regions corresponding to the plurality of second storage addresses,
    respective intactness of respective firmware programs stored in respective second storage regions corresponding to the plurality of second storage addresses, and
    respective version numbers of respective firmware programs stored in respective second storage regions corresponding to the plurality of second storage addresses; and
  activate the at least a portion of the second storage region corresponding to the selected second storage address.

11. The terminal of claim 7, wherein the processor is further configured to:
  send to a server the request for an up-to-date firmware program of the terminal;
  receive the up-to-date firmware program from the server in response to the request;
  determine respective activation states of the first storage region and the second storage region; and
  in response to a determination that the first storage region is activated and the second storage region is inactivated:
    update a firmware program stored in the inactivated second storage region with the up-to-date firmware program,
    deactivate the first storage region, and
    activate the second storage region.

12. The terminal of claim 7, wherein the processor is further configured:
  send to a server the request for an up-to-date firmware program of the terminal;
  receive the up-to-date firmware program from the server in response to the request;
  determine respective activation states of the first storage region and the second storage region; and
  in response to a determination that the second storage region is activated and the first storage region is inactivated:
    update a firmware program stored in the inactivated first storage region with the up-to-date firmware program,
    deactivate the second storage region, and
    activate the first storage region.

13. A device to restore a firmware program, to be used with a terminal having an activated first storage region storing a first firmware program most recently executed by the terminal and an inactivated second storage region storing a back-up firmware program, wherein the first firmware program and the back-up firmware program are the same version, and wherein the back-up firmware program stored in the second storage region is configured to be updated in response to a request for an up-to-date firmware program of the terminal, the device comprising:
  a processor; and
  a memory for storing instructions executable by the processor;

wherein the processor is configured to:
  receive a signal to restore a firmware program in the terminal;
  in response to the receiving of the signal to restore the firmware program, deactivate the first storage region and activate the second storage region;
  load in the terminal the back-up firmware program stored in the activated second storage region;
  delete the first firmware program stored in the deactivated first storage region;
  write to the deactivated first storage region the back-up firmware program stored in the activated second storage region, wherein the back-up firmware program stored in the activated second storage region and the deleted first firmware program are the same version; and
  after loading in the terminal the back-up firmware program stored in the activated second storage region, load in the terminal at least one of user settings or configuration data that were stored in the terminal before restoring the firmware program.

14. A non-transitory computer-readable storage medium storing instructions that, when executed by a processor of a terminal having an activated first storage region storing a first firmware program most recently executed by the terminal and an inactivated second storage region storing a back-up firmware program, wherein the first firmware program and the back-up firmware program are the same version, and wherein the back-up firmware program stored in the second storage region is configured to be updated in response to a request for an up-to-date firmware program of the terminal, cause the terminal to:
  receive a signal to restore a firmware program in the terminal;
  in response to the receiving of the signal to restore the firmware program, deactivate the first storage region and activate the second storage region;
  load in the terminal the back-up firmware program stored in the activated second storage region;
  delete the first firmware program stored in the deactivated first storage region;
  write to the deactivated first storage region the back-up firmware program stored in the activated second storage region, wherein the back-up firmware program stored in the activated second storage region and the deleted first firmware program are the same version; and
  after loading in the terminal the back-up firmware program stored in the activated second storage region, load in the terminal at least one of user settings or configuration data that were stored in the terminal before restoring the firmware program.

* * * * *